Sept. 17, 1963  R. J. HERBOLD  3,103,906
SOLDERING IRON ACCESSORY
Filed June 10, 1960

INVENTOR.
ROBERT J. HERBOLD
BY
ATTORNEYS

United States Patent Office 3,103,906
Patented Sept. 17, 1963

3,103,906
SOLDERING IRON ACCESSORY
Robert J. Herbold, Denver, Colo., assignor to
James R. Bevington, Denver, Colo.
Filed June 10, 1960, Ser. No. 35,347
8 Claims. (Cl. 113—98)

This invention relates to soldering accessories and, more specifically, to a quencher for use with soldering irons that also functions in the capacity of a thermal-conductor adapted to by-pass heat from a soldered joint away from delicate electrical or electronic components.

In recent years, a number of pistol-type trigger-operated soldering guns have been developed which produce intense heat almost instantaneously and are, therefore, extremely useful in rapid electrical or electronic assembly operations. Also, these soldering guns are customarily equipped with small pointed tips that are ideally suited for use in complex electronic circuits where little room is available between components. Of course, the older style of soldering iron is still used to some extent, in fact, where carefully controlled temperatures must be used to prevent damage to components such as transistors, the constant-heat irons are still preferable.

Regardless of which type of iron is used or needed in a given situation, it is customary to allow the soldered joint or connection to set by natural connection cooling. Thus, while modern irons are capable of melting the solder and heating the joint almost instantaneously with an attendant saving in assembly time, much time is still lost in holding the components in assembled relation while the solder cools and sets. Many times the joint is even weakened or broken completely while waiting for the air to cool the solder to the point where it is firm either because the components are released prematurely or unexpectedly jarred loose. Obviously, when an iron is only used to make an occasional soldered connection, this problem is not especially significant; however, on the other hand, in production line assembly operations where complex electrical or electronic units are manufactured, it becomes of major importance due to the time and expense involved.

Yet another problem brought about by the use of the ordinary soldering gun is that of the damage caused to adjacent components when the joint is heated preparatory to application of the solder. For example, it is not uncommon to find that some of the insulation has been melted from leads close to the soldered joint, especially when high-wattage irons are employed or the working area is highly restricted. Even more serious is the risk of damaging some of the delicate and quite expensive components themselves, particularly transistors, many of which cannot withstand temperatures much in excess of 100° F.

It is, therefore, the principal object of the present invention to provide a novel soldering iron accessory in the form of a self-contained quencher that instantaneously cools and sets the soldered joint while also providing means for conducting the heat away from delicate components before they can be damaged.

A second objective is the provision of a device of the character described that is carried by the iron itself thus leaving one of the user's hands free to hold the components being soldered in proper assembled relation.

Another object is to provide a quencher for soldering guns and the like that carries its own liquid reservoir which may be filled with water, a liquid flux, an aqueous solution containing a dissolved corrosion inhibitor, or a combination of the latter.

Still another object of the instant invention is to provide a combination quencher and heat dissipating device that is attachable to any of the common types of soldering irons for universal tiltable movement relative thereto while including a telescopable tip preferably containing a slight angular bend that enables the tip thereof to be positioned wherever is most convenient in relation to the workpiece and soldering tip.

An additional objective is the provision of a quencher that employs a hollow tubular construction which enables a wick-type liquid feed to be used therewith so that the point of emergence of the liquid can be carefully controlled.

Further objectives are to provide a soldering accessory that is simple, compact, versatile, inexpensive, easy to use, rapidly installed, decorative, fully adjustable, and one that results in a substantial saving in time and effort of the user.

Other objects will be in part apparent and in part pointed out specifically hereinafter in connection with the description of the drawings that follows and in which.

Figure 1:
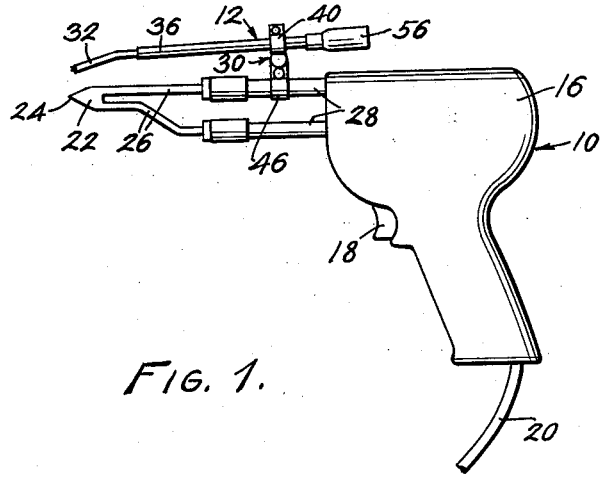
FIGURE 1 is a side elevation showing a conventional pistol-type soldering gun equipped with the combination quencher and thermal conductor of the present invention.
Figure 5:
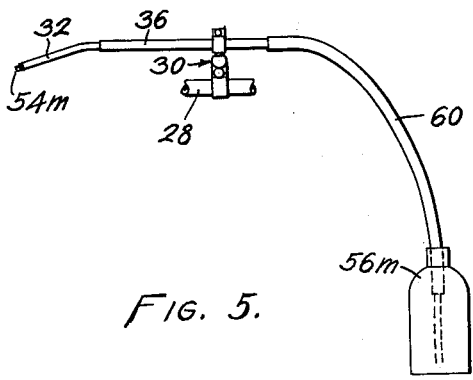
Figure 6:
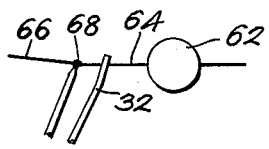

FIGURE 5 is a fragmentary view similar to FIGURE 1 but showing a slightly modified form of the invention in which the small reservoir carried on the rear-end of the barrel is replaced by a larger capacity reservoir supported on a suitable working surface and connected to the barrel by means of a flexible tube; and FIGURE 6 is a fragmentary view showing the relative positions of the soldering tip and quencher tip when the latter is used as a thermal conductor to protect a delicate component adjacent the connection being soldered.

Referring now to the drawings for a detailed description of the instant invention, and in particular to FIGURE 1 for this purpose, it will be seen that reference numeral 10 designates a conventional pistol-type soldering gun in a general way and numeral 12 broadly designates the combination quencher and thermal conductor which forms an accessory therefor. The particular soldering iron illustrated herein, as aforementioned is of the pistol-type having a pistol-grip stock 16, a trigger switch 18 which when actuated closes the circuit supplying electrical energy by means of conductor 20 to resistance heating element or tip 22. The tip 22, as shown, terminates in a pointed end 24 and includes a pair of integrally-formed arms 26 that are detachably connected within double barrels 28 projecting forwardly from the stock. A gun of this type develops intense heat almost instantaneously and, therefore, is apt to damage delicate components, especially when used by an inexperienced operator. Of course, this type of soldering iron is intended as being merely illustrative of one of many types and styles of commercially available irons that will accept the accessory that forms the subject matter of the present invention although some of the constant low-heat units are less likely to damage components and, therefore, have more need for the quenching function than the thermal conductive one. Thus, although the description herein will be largely confined to a pistol-type soldering gun, it is to be understood that the claimed accessory is equally adaptable to use on other types.

The accessory 12 is preferably mounted on a portion of the iron 10, such as one of the barrels 28, that does not become too hot; otherwise, the heat from the iron will cause excessive evaporation of the quenching liquid. In irons of other types this accessory will customarily be mounted on the handle adjacent the tip. A clamp, indicated in a general way by numeral 30, provides the means by which the accessory is fastened to the iron. Clamp 30, in the particular form shown, provides for substantially universal movement of the accessory relative to the tip of the gun and is, therefore, preferred; however, a clamp providing for only tiltable movement is quite satisfactory especially when the tip 32 is formed to include a moderate angular bend 34 and is mounted rotatably within barrel 36 thereof. In fact, for certain specific applications, it would even be desirable to mount the accessory 12 rigidly on the iron 10 and form the tip 32 so as to place it in a fixed position relative to the soldering tip 22.

Figure 3:
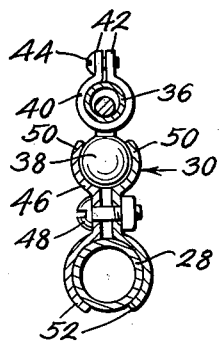
FIGURE 3 is a transverse section taken along line 3—3 of FIGURE 2.
Figure 2:
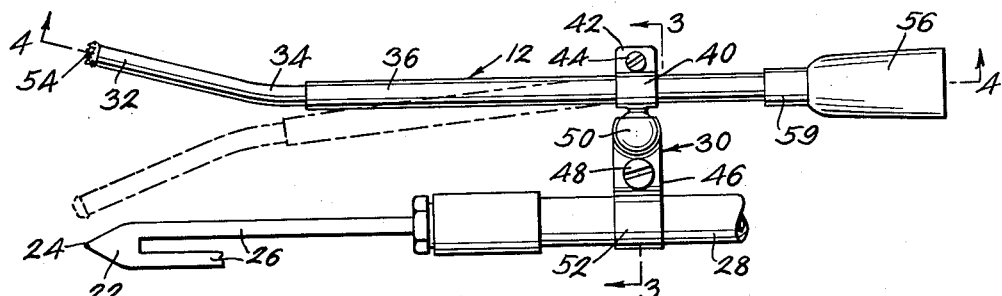
FIGURE 2 is a fragmentary side elevation to an enlarged scale, showing the details of construction of the device along with the universal clamp used to connect the unit to the gun.

In FIGURES 2 and 3 it can be seen that clamp 30, in the particular form illustrated, is of the ball and socket type providing for universal movement between the elements interconnected thereby. It includes a ball portion 38 having a hose-type clamp fitting 40 depending therefrom adapted to receive and hold the barrel 36 of the accessory therein. Fitting 40 is preferably provided with a pair of substantially parallel ears 42 interconnected by a screw 44 that cooperate with one another to permit the barrel to be adjusted longitudinally within the clamp relative to the iron thus enabling the accessory to be easily and quickly adapted for use with soldering devices of different length and style.

The ball portion 38 of the clamp is frictionally retained for substantially universal movement within socket portion 46 thereof. The socket portion 46 of the clamp is formed in two parts interconnected by a screw 48 and each includes a spherical depression 50 on one end and a generally arcuate finger 52 on the other. The fingers 52 are arranged in opposed relation on socket portion 46 and cooperate with one another to receive and clamp onto a portion of the soldering iron when screw 46 is turned down tight.

Figure 4:
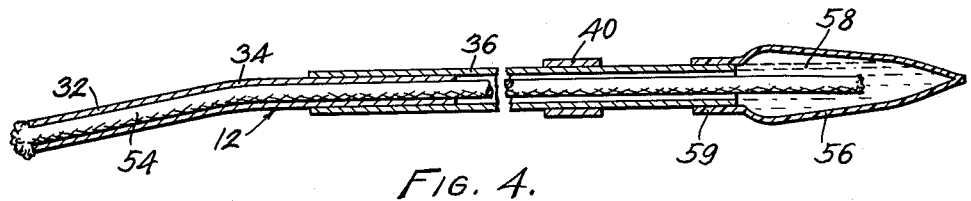
FIGURE 4 is a longitudinal section taken along line 4—4 of FIGURE 2 illustrating the liquid reservoir and wick.

Now, with reference to FIGURES 2 and 4 it can be seen that the soldering accessory 12 that forms the subject matter of the present invention comprises a tubular tip 32 mounted within a tubular barrel 36 for relative rotational and telescopic movement, a wick 54 extending the entire length of both the barrel and tip, and a quenching fluid reservoir 56 attached to the rear end of the barrel with the wick immersed in the quenching fluid 58 contained therein. The clamp 30, of course, permits relative longitudinal and tiltable movement of the soldering accessory 12 relative to the iron as indicated by the full and dotted line positions of FIGURE 2; however, five longitudinal adjustments of the exposed end of the wick 54 relative to the pointed end 24 of the soldering tip 22 and the connection being soldered are preferably accomplished by telescoping tip 32 in or out of barrel 36 rather than loosening the barrel in the clamp. Also, in the preferred embodiment of the invention, a small angular bend 34 is provided in tip 32 intermediate the ends thereof for the purpose of providing further adjustment when the tip is rotated within the barrel.

The wick projects slightly beyond the front end of the accessory tip in position to deliver the quenching fluid contained therein to the soldered joint for the purpose of cooling and setting the latter. The fluid is drawn through the wick by capillary action from within reservoir 56 within which the other end of the wick is submerged.

Fluid reservoir 56 is preferably fabricated from some deformable plastic to form a "squeeze-bottle" which when pinched and released will draw fluid therein from a suitable source thereof. The open neck 59 of the reservoir is adapted for frictional attachment to the rear end of the barrel as shown. The reservoir is easily filled by removing the tip 32 and wick 54 from within the barrel; whereupon, the front end of the barrel is emersed in the source of fluid preparatory to operating the squeeze bottle.

Following completion of a soldered connection, it is only necessary to touch the wet projecting end of the wick to the hot solder to cool and set same. As has already been mentioned, the reservoir can be filled with plain water, an aqueous solution containing a dissolved corrosion inhibitor, a liquid flux or any combination of the latter.

The modification of FIGURE 5 differs from that of FIGURES 1–4 in that the wick 54m is considerably longer and is submersed in a shelf-supported reservoir 56m of considerably greater capacity rather than being carried with the iron as a part of the accessory This modification, of course, requires the interpositioning of a flexible tube 60 between the rear end of the accessory and the reservoir within with the wick is contained. This modification is primarily designed for use on production lines where the capacity of the self-contained reservoir 56 is too small for practicality.

Finally, with reference to FIGURE 6, the use of the accessory of the present invention as a means for protecting delicate components from the intense heat developed in the soldered joint has been illustrated. Numeral 62 designates an electronic component such as a transistor having a lead 64 that requires a soldered connection to another lead 66. The accessory tip 32 is preferably extended telescopically beyond the soldering tip and placed in overlying contacting relation to lead 64 between the soldered joint 68 and the component 62. Then, when the joint is made, the heat conducted through lead 64 is by-passed into the accessory tip 32 before it reaches component 62. For this reason, at least the accessory tip 32, and preferably both the tip and barrel are fabricated from a metal having good heat conducting properties such as, for example, brass or copper.

Having thus described the several useful and novel features of the soldering accessory of the present invention, it will be seen that the many worthwhile objectives for which it was designed have been achieved. Although but a few specific embodiments of the invention have been illustrated herein, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. In an electric soldering device having a heated tip of small dimension, the combination with said device of an elongate heat-resistant tube forming means having open front and rear ends, a collapsible reservoir means adapted to contain a cooling fluid and connected to the rear end of the tube forming means to deliver the fluid contained therein thereto, wick means disposed within the tube forming means, throughout the length thereof, with one end accessible through the open front end thereof and the other end terminating in contact with a liquid contained in the reservoir means, said wick means being adapted to transport liquid from the reservoir means through the tube forming means and deliver it at the open end and clamp means attached to the tube means and clamping same to the soldering device with the open front end thereof and wick in immediate juxtaposition to the working portion of the heated tip.

2. The arrangement of claim 1 in which the tube-forming means comprises at least one rigid tubular element and a flexible tubular element interconnecting the rigid tubular element and the reservoir means.

3. The arrangement of claim 1 in which the tube-forming means and clamp means are connected to permit relative longitudinal adjustment therebetween.

4. The arrangement of claim 1 in which the clamp means includes a pivot joint adapted to provide relative tiltable movement between the tube-forming means and soldering iron when mounted on the latter.

5. The arrangement of claim 1 in which the clamp means includes a universal joint adapted to provide relative universal movement between the tube-forming means and soldering iron when mounted on the latter.

6. The arrangement of claim 1 in which the tube-forming means is fabricated from a thermal conductive material adapted to conduct heat away from a workpiece when laid thereagainst.

7. The arrangement of claim 1 in which the tubular element having the open front end includes an angular bend of not greater than approximately 45° intermediate the ends thereof and is mounted within the other of said tubular elements for relative rotational movement.

8. The soldering iron accessory as set forth in claim 2 in which the reservoir includes an open neck sized and adapted to receive the rear end of the tube-forming means with a substantially liquid-tight friction fit.

References Cited in the file of this patent

UNITED STATES PATENTS

| | | |
|---|---|---|
| 955,172 | Kirkwood | Apr. 19, 1910 |
| 1,253,906 | Sutter | Jan. 15, 1918 |
| 1,262,499 | Howell | Apr. 9, 1918 |
| 1,519,639 | Simmons | Dec. 16, 1924 |
| 2,019,789 | Mahannah | Nov. 5, 1935 |
| 2,365,539 | Flowers | Dec. 19, 1944 |
| 2,752,199 | Newell | June 26, 1956 |
| 2,869,497 | Lehner | Jan. 20, 1959 |
| 2,987,261 | McCuiston et al. | June 6, 1961 |